Patented May 23, 1944

2,349,590

UNITED STATES PATENT OFFICE 2,349,590

TOCOPHEROL-CONTAINING COMPOSITION AND PROCESS OF PREPARATION

Kenneth C. D. Hickman, Rochester, N. Y., assignor to Distillation Products, Inc., Rochester, N. Y., a corporation of Delaware No Drawing. Application November 6, 1941, Serial No. 418,043

4 Claims. (Cl. 167—81)

This invention relates to new compositions containing tocopherol useful for medicinal and dietary purposes, and improved method for preparing such compositions.

This invention has for its object to provide cheap medicinal or dietary preparations containing relatively large amounts of tocopherol. A further object is to provide useful compositions from deodorizer scum and like materials which scum has heretofore been considered to be substantially worthless, especially from a medicinal or dietary standpoint. A further object is to improve the state of the medicinal and dietary arts. Other objects will become apparent from the following description and claims.

I have discovered that scum produced during the vacuum-carrier gas treatment of a vegetable or animal oil which contains tocopherol can be utilized as a medicinal or dietary agent. The scum is produced by condensing or removing the organic matter from the carrier gas after it has been passed through the oil being treated. My invention includes the method of preparing such medicinal or dietary agents and the agents as new products or compositions.

In the following description and claims I have given several of the preferred embodiments of my invention, but it is to be understood that these are set forth for the purpose of illustration and not in limitation thereof.

The scum which is utilized in my invention is a substance which has heretofore been a waste by-product of the vegetable and animal oil industry and particularly the animal and vegetable oil (i. e. glyceride oil) deodorization industry. This material is a complex mixture of organic compounds volatilized from the oil during deodorization and like procedures. The most common method of deodorizing vegetable and animal oils is to pass steam therethrough under reduced pressure. The steam after passing through the oil is usually condensed in a barometric condenser and the condensed steam is then permitted to flow into a sump, catch basin, or condenser discharge. The scum separates on the surface of the water in the sump or condenser and may be skimmed off. It has heretofore been the usual practice to permit it to flow into the sewer. The scum also collects on the walls of the apparatus and may be removed therefrom. Such materials are known in the deodorization art as "deodorizer hot-well sludge," "catch basin scum," "catch-all sludge," etc. It is also somewhat common procedure in the deodorizing field to place a trap between the deodorizer and the condenser, in which case the scum or its substantial equivalent is partially or completely condensed in the trap instead of entirely passing into the barometric catch basin or sump. Such material is known in the deodorizing art as "trap sludge." It is to be understood that the word scum as used herein and in the claims shall include all such matters in crude or partially refined condition produced by the methods mentioned or by any equivalent method involving the separation of the organic material volatilized during the carrier gas, vacuum treatment of vegetable and animal oils which contain tocopherol.

Useful scum can only be obtained from the foregoing procedures when applied to oils which contain tocopherol. Most of the vegetable and animal oils in their fresh and natural condition contain this material, but the vegetable oils are usually considerably richer sources and I prefer to utilize scum produced from them. Examples of particularly rich oils are corn, cottonseed and soybean. Fresh oils are preferred as a source of the scum and particularly oils which have been subjected to no treatment which would have a harmful effect upon the tocopherol. Ordinarily alkali refining decreases the tocopherol content, but oils which have been alkali refined can serve as a useful source, although a poorer one than the crude oils.

The scum may be directly utilized with or without pretreatment to remove constituents such as water, free fatty acids, entrained solids, etc. It is preferred that the scum first be dehydrated as this assists in the formation into pills, tablets and other shapes suitable for ingestion and avoids undesirable reactions due to the presence of water, such as loss of tocopherol. Removal of water can be accomplished by the simple expedient of heating which causes the scum to melt and separate as an upper layer of oil which is substantially anhydrous. After separation of the oil layer followed by cooling there is obtained a mushy to solid material which can be easily compressed into suitable pellets for ingestion or for incorporation in foods, and the like. Dehydrated scum from hydrogenated oils is usually quite solid at room temperature. If the scum is not sufficiently solid it may be mixed with solid fillers, hardened fats, etc., to arrive at a satisfactory consistency. If the removal of fatty acids is contemplated it is desirable to leave a small amount since the tocopherol seems to be more stable in their presence.

By a preferred embodiment of my invention the scum is associated with a solid carrier which offers a simple vehicle for the incorporation of the scum in the diet of animals including man. Any solid carrier can be used so long as it can be ingested by the human or animal organism without undesirable effects, and so long as it is substantially non-reactive with the tocopherol content of the scum. These properties are in general characteristics of vegetable tissue which are the preferred carrier materials. Finely divided carriers offer a quick and simple way of incorporating in foods, etc., and are preferred. Examples of satisfactory carriers are ground alfalfa, coconut meal, breakfast cereals, bran, wheat middlings, granular magnesium carbonate, pumice, and the like. Carrier materials which are foods are usually to be preferred.

It is desirable that the mixture of carrier and scum be complete so that the scum is substantially evenly distributed throughout or upon the surface of the carrier. This can be brought about by stirring and thorough agitation during the mixing operation. Slight heating would have no undesirable effect and would increase the rate of distribution. It is desirable, but not essential, that the scum be treated to remove the water with which it is immiscible and free fatty acids. This tends to improve the stability and palatability. Up to about 35 per cent of scum can thus be incorporated on carriers, the amount incorporated depending upon the concentration of tocopherol desired in the final product. The mixture can be treated with steam in a heated or unheated container at ordinary, but preferably under reduced, pressure to improve the taste, etc. Steaming for ten minutes to three hours is usually sufficient. This has no destructive effect on the tocopherol present in the scum.

*Example 1.*—Crude scum was warmed to form an aqueous and an oil layer. 20 parts of the oil or scum layer containing 5 per cent of tocopherol was thoroughly incorporated with 80 parts of wheat middlings to yield a relatively palatable, flaky, mixture containing about 1 per cent of tocopherol. This product was unusually stable, containing 75 per cent of its original tocopherol at the end of one month's exposure to air at room temperature.

*Example 2.*—460 grams of crude scum substantially free of water was dissolved in methyl acetate to form a 1 per cent solution. This solution was cooled to −42° C. to remove sterols and fatty acids which precipitated as solids. The solution was filtered and the filtrate distilled to remove solvent. The oil residue, weighing 175 grams was thoroughly incorporated in 640 grams of wheat middlings by warming and stirring. The product was of good stability, palatability and contained approximately 1 per cent tocopherol.

*Example 3.*—A mixture of scum and wheat middlings was prepared by thorough intermixture as described in Example 1. The mixture was then placed in a steam deodorizer and steam introduced or drawn continuously thereinto with stirring for two hours at a pressure of 50 mm. The middlings were withdrawn and were found to contain approximately 1 per cent tocopherol and to have a free fatty acid content of less than 1 per cent. This product was bland.

*Example 4.*—100 gallons of scum from the deodorization of corn oil were treated with 12 gallons of commercial concentrated hydrochloric acid and the mixture brought to boil, and intimate admixture, by contact with a steam jet. The acid and soluble chlorides were then allowed to settle, and the supernatant oil was washed three times with water. The oil was decanted and passed through a centrifuge until a substantially dry, bright oil of light brown color was secured. This oil contained approximately 2 per cent gamma tocopherol and was found suitable for addition to finely divided animal (including human) foods without further treatment.

*Example 5.*—Hotwell deodorizer scum is melted and the substantially anhydrous fatty layer separated or the deodorizer scum may be substantially dewatered by any well-known means. The fatty material is introduced into a capsule, or other well-known unit for medicinal administration. The resulting capsule is then suitable for administration as a source of vitamin E.

*Example 6.*—Deodorizer scum obtained preferably from the deodorizing of hardened fat containing tocopherol is collected and clarified as above and allowed to cool when it forms a solid paste. If the paste becomes too soft to handle at 100° F., addition is made of hardened fat or other stiffening agent. The mixture is rolled into pills for administration as above. A digestible or partially digestible coating on the pills is desirable.

*Example 7.*—The deodorizer scum may be partially purified before molding into administrable form as in the previous example.

*Example 8.*—Crude deodorizer scum is mixed with magnesium carbonate, powdered chalk or other mildly alkaline material and the mixture allowed to react until substantially all the free fatty acid in the scum is neutralized. The mixture may then be powdered and used as an addition to animal feed or compressed into tablets for medicinal administration.

*Example 9.*—Deodorizer scum, after dewatering, is incorporated with chopped animal feed and to the mixture is added sufficient lime, to neutralize a small portion of the free fatty acid in the scum, it being intended that the resultant mixture shall remain faintly acid to protect the scum from too rapid oxidation.

*Example 10.*—Deodorizer scum is mixed with 4 times its weight of corn oil, chilled to 50° F., and filtered. The filtrate, containing approximately 1% of tocopherol is used as a medicinal concentrate of vitamin E.

*Example 11.*—The corn oil mixture prepared as in Example 10 is subjected to mild deodorization by steam and/or alkali refining. The product is a bland medicinal solution containing about 1% of vitamin E.

The character of scum depends upon the oil from which it is derived and it is preferred that scum of exceptionally high free fatty acid content, high odor or other undesirable properties be utilized for the preparation of poultry and like feeds. This is also a useful field of application for the scums having a lower potency range. The products produced may be directly used or they may be incorporated with other food mixtures and evenly distributed therethrough. Also, if desired, the scum-carrier mixture may be incorporated in capsules, compressed into pills, cakes, etc.

The product described herein contrary to expectation represents a palatable and stable source of vitamin E. It also represents a very cheap source of this material since the scum has heretofore been considered to be worthless, and certainly was never considered to have useful medicinal, dietary or similar characteristics. While it is possible to isolate the tocopherol and use it as such, I have found that the scum can be satisfactorily used as described without complicated and costly treatment, amounting to isolation, of its tocopherol content.

The word "inert" as used herein and in the claims means that the material is inert with respect to tocopherol, i. e., that it does not cause decomposition of the tocopherol. The word is not intended to mean that the material is unaffected by the animal digestive system.

What I claim is:

1. A new composition of matter useful as a source of tocopherol for medicinal or dietary purposes, said composition comprising substantially dry finely divided inert vegetable tissue as a carrier substance upon which is substantially evenly distributed dry scum derived from the steam utilized for the vacuum steam deodorization of a vegetable oil which contains tocopherol.

2. A new composition of matter useful as a source of tocopherol for medicinal or dietary purposes, said composition comprising a finely divided substantially inert carrier substance upon which is substantially evenly distributed scum derived from the steam utilized for the vacuum deodorization of a glyceride oil which contains tocopherol, said mixture of substantially inert carrier and scum having been subjected to a vacuum-steam deodorization treatment after intermixture.

3. The process of preparing a tocopherol preparation useful for medicinal or dietary purposes, which comprises evenly distributing scum upon a substantially inert finely divided solid carrier, which scum is derived from the steam utilized for the vacuum deodorization of a vegetable oil which contains tocopherol, and then subjecting the mixture of finely divided carrier and scum to a deodorization treatment with steam under vacuum.

4. A new composition of matter useful as a tocopherol concentrate for medicinal or dietary purposes, said composition comprising a substantially dry, finely divided, inert, solid carrier substance upon which is substantially evenly distributed scum derived from the steam utilized for the vacuum deodorization of a glyceride oil which contains tocopherol, said scum being distributed on the carrier in sufficiently large amounts to give a mixture having a relatively high concentration of tocopherol.

KENNETH C. D. HICKMAN.